United States Patent

Stevenson

[15] 3,686,444

[45] Aug. 22, 1972

[54] TELEPHONE INSTRUMENTS

[72] Inventor: Robert Andrew Stevenson, 34 Haukshead Place, Newton Aycliffe, England

[22] Filed: March 1, 1971

[21] Appl. No.: 122,583

[52] U.S. Cl. .......... 179/81 R

[51] Int. Cl. .......... H04m 1/00

[58] Field of Search .......... 179/81 R, 2.5 R

[56] References Cited

UNITED STATES PATENTS 3,510,584 5/1970 Krasin .......... 179/2.5 R

*Primary Examiner*—Kathleen H. Claffy
*Assistant Examiner*—William A. Helvestine
*Attorney*—Kirschstein, Kirschstein, Ottinger & Frank

[57] ABSTRACT

In a push-button telephone instrument including electronic circuits for storing push-button derived signals and for generating call signalling impulses, a battery within or associated with the instrument for energizing the electronic circuits is recharged during non-impulsing periods of telephone calls by means of the energizing current from the exchange for the carbon granule microphone.

6 Claims, 2 Drawing Figures

INVENTOR
ROBERT ANDREW STEVENSON
BY
ATTORNEYS

TELEPHONE INSTRUMENTS

The present invention relates to telephone instruments.

In particular although not exclusively the invention relates to push-button telephone instruments incorporating electronic means for converting electric signals derived from operation of the push-buttons into trains of Strowger-type impulses for signalling to exchange equipment the digits of a number to be called. Since such trains of impulses are usually signalled by alternately open-circuiting and short-circuiting the line to the exchange the converting means cannot be energized directly from the exchange during impulsing, and must incorporate a local source or power store, such as a rechargeable battery. Such electronic means is described for example in copending U.S. Pat. application No. 790,304.

According to the present invention in a telephone instrument including electronic circuit means which in operation is energized at least in part from a rechargeable battery contained within or associated with the instrument, the battery is arranged to be connected in series with one of the transducers of the telephone instrument for the purpose of charging the battery and energizing the transducer from the exchange by way of the telephone line to the instrument when the instrument is in the off-hook condition and dialling impulses are not being transmitted by said instrument over said telephone line, and shunt regulator means are connected in parallel with the battery to control the charging current flow to the battery.

Preferably the battery and shunt regulator means are connected across one diagonal of a rectifier bridge the other diagonal of which is connected in series with said transducer. Said transducer may be a carbon microphone.

A telephone subscriber's instrument or apparatus in accordance with the present invention will now be described by way of example with reference to the accompanying drawings, of which:

Figure 1:
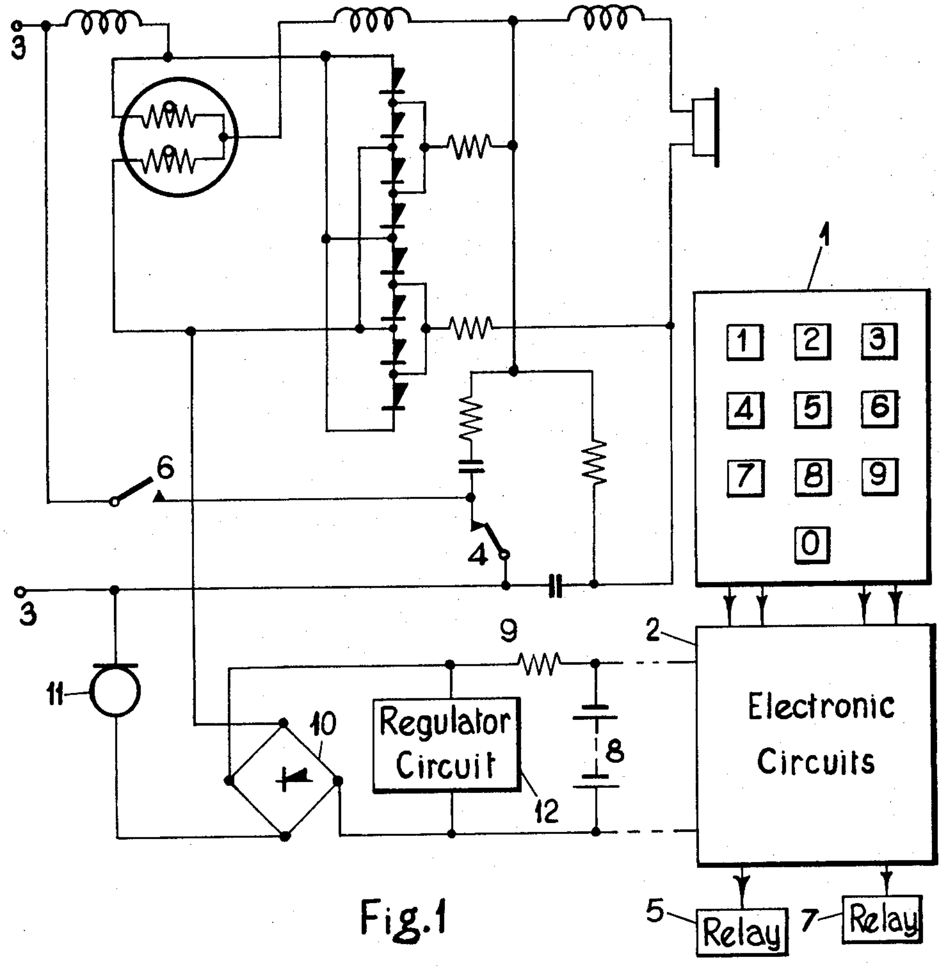
FIG. 1 shows the circuit of the instrument diagrammatically.

Referring to the drawings the instrument comprises a conventional handset and a base (not shown) having a set of ten or more push-buttons 1 substituted for the conventional dial. Mounted within the base of the instrument are electronic circuits 2 for storing the values of digits generated by operation of the respective push-buttons and for converting these stored values into trains of Strowger-type impulses for signalling the digit values of the number to be called to an exchange by way of line wires 3.

The impulses are signalled to the exchange conventionally by alternating opening and closing a set of contacts 4 of a relay 5 respectively to open and close a loop circuit to the exchange by way of the line wires 3, and since the electronic circuits 2 for storing and converting digit values are generally required to be in operation during impulsing these circuits 2 cannot be energized directly from an exchange battery (not shown) by way of the telephone line wires 3. A short-circuit connection is applied across the line wires 3 by means of a set of contacts 6 of a relay 7 which is arranged to be energized so long as any digit values are stored in the circuits 2. A storage battery 8, for example a nickel-cadmium battery, is therefore provided within the instrument for energizing the storing and converting circuits 2.

The battery 8 is connected in series with a close tolerance resistor 9 of, say, forty seven ohms across one diagonal of a rectifier bridge 10 the other diagonal of which is connected in series with the carbon microphone 11 of the instrument. Also connected across the said one diagonal of the rectifier bridge 10, in parallel with the resist or-battery combination, is a shunt regulator circuit 12.

Figure 2:
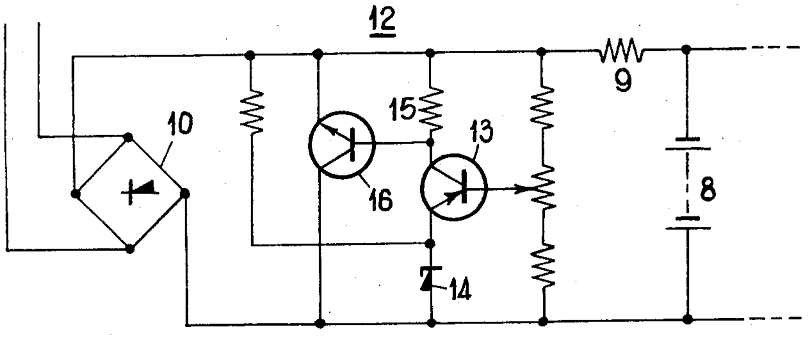
FIG. 2 shows a part of the circuit of FIG. 1 in greater detail.

Referring in particular to FIG. 2, the regulator 12 comprises a p-n-p transistor 13 to the emitter electrode of which is applied the voltage developed across a zener diode while to its base electrode is applied a voltage proportional to that developed across the resistor-battery combination. The collector load 15 of the transistor 13 is connected across the base-emitter junction of an n-p-n transistor 16 whose emitter-collector path provides the main shunt current path through the regulator 12.

When the battery 8 is partially or fully discharged its voltage is low and the transistors 13 and 16 of the regulator 12 are biased either effectively to cut off or to a comparatively low-conduction condition, so that all or most of the energizing current flowing through the microphone 11 from the exchange battery by way of the associated telephone line wires 3 (when the handset is off-hook) also flows as a charging current through the battery 8. When the battery 8 is substantially fully charged its voltage is high and the transistors 13 and 16 are biased to a conducting condition such that substantially all of the energizing current for the microphone 11 flows by way of the regulator circuit 12.

The rectifier bridge 10 enables the battery 8 to be charged with either polarity of supply voltage from the exchange. The alternating current impedance of the battery 8 and shunt regulator circuit 12 is low and so has little effect on the speech circuit of the telephone instrument. The unidirectional voltage across the rectifier bridge 10, which is dependent upon the voltage of the battery being used, limited the maximum line length on which the telephone instrument can be operated satisfactorily. The shunt regulator circuit 12 may be replaced by a zener diode.

I claim:

1. Telephone subscribers apparatus including a microphone transducer and a receiver transducer, at least one of which is energized in operation by a unidirectional current from an exchange battery, electronic circuit means for signalling to exchange equipment signals derived by operation of push-buttons of the instrument, and a rechargeable battery contained within the instrument for energizing said circuit means at least in part, wherein there are provided means to connect the battery in series with said one of the transducers of the instrument in the energizing current path thereof, shunt regulator means, and means connecting said shunt regulator means in parallel with the battery.

2. Telephone subscribers apparatus in accordance with claim 1 wherein said means to connect the battery in series with said transducer comprises a rectifier bridge one diagonal of which is connected in series with the transducer and the other diagonal of which is connected across said battery.

3. Telephone subscribers apparatus in accordance with claim 1 wherein said one transducer is the microphone transducer.

4. Telephone subscribers apparatus in accordance with claim 3 wherein said microphone transducer is a carbon granule transducer.

5. Telephone subscribers apparatus in accordance with claim 1 wherein said shunt regulator means comprises a zener diode.

6. Telephone subscribers apparatus in accordance with claim 1 wherein said shunt regulator means comprises a transistor circuit.

* * * * *